United States Patent [19]

Lew

[11] Patent Number: 4,639,293

[45] Date of Patent: Jan. 27, 1987

[54] PARTIALLY EVACUATED SOLAR STILL

[76] Inventor: Hyok S. Lew, 7890 Oak St., Arvada, Colo. 80005

[21] Appl. No.: 492,445

[22] Filed: May 6, 1983

[51] Int. Cl.⁴ ............................................. B01D 3/10
[52] U.S. Cl. .................................... 202/205; 202/176;
202/181; 202/185 R; 202/234; 203/1; 203/4;
203/11; 203/21; 203/91; 203/DIG. 1; 159/903;
159/DIG. 16
[58] Field of Search ............... 202/181, 234, 205, 176,
202/185.1; 203/DIG. 1, 4, 11, 21, 1, 91, 10,
DIG. 17, DIG. 18; 159/903, DIG. 16, DIG. 40, DIG. 32

[56] References Cited

U.S. PATENT DOCUMENTS

| 1,306,056 | 6/1919 | Fourness | 202/180 |
|---|---|---|---|
| 2,320,853 | 6/1943 | Delahanty | 202/180 |
| 2,490,659 | 12/1949 | Snyder | 202/234 |
| 3,088,882 | 5/1963 | Justice | 202/180 |
| 3,232,846 | 2/1966 | Kimmerle | 208/DIG. 1 |
| 3,330,740 | 7/1967 | Duffy | 203/DIG. 1 |
| 3,616,270 | 10/1971 | Ferrara | 203/DIG. 1 |
| 4,247,369 | 1/1981 | Bean | 202/234 |

FOREIGN PATENT DOCUMENTS

| 2500132 | 8/1982 | France | 159/1 S |
|---|---|---|---|
| 53-2385 | 1/1978 | Japan | 203/DIG. 1 |
| 7710273 | 3/1979 | Netherlands | 202/234 |

Primary Examiner—Kenneth M. Schor
Assistant Examiner—V. Manoharan

[57] ABSTRACT

This invention relates to a solar still wherein the evaporation takes place in partially evacuated tubings which are heated by sunlight. The water to be distilled is supplied from a reservoir vessel which is sealed off after batch loading. The reservoir vessel is elevated above the solar collector. The water is fed into the heater tubings routed through the solar collector by gravity, through an orifice and a heat exchanger-condenser. The steam tubing branches off from the heater tubing in the solar collector vertically, and is routed through the heat exchanger-condenser. At this end, it is connected to a vertical tubing of a sizable length that empties into the distilled water reservoir. The exit end of the heater tubing routed through the solar collector is connected to another vertical tubing of a sizable length that empties into an overflow tank.

5 Claims, 3 Drawing Figures

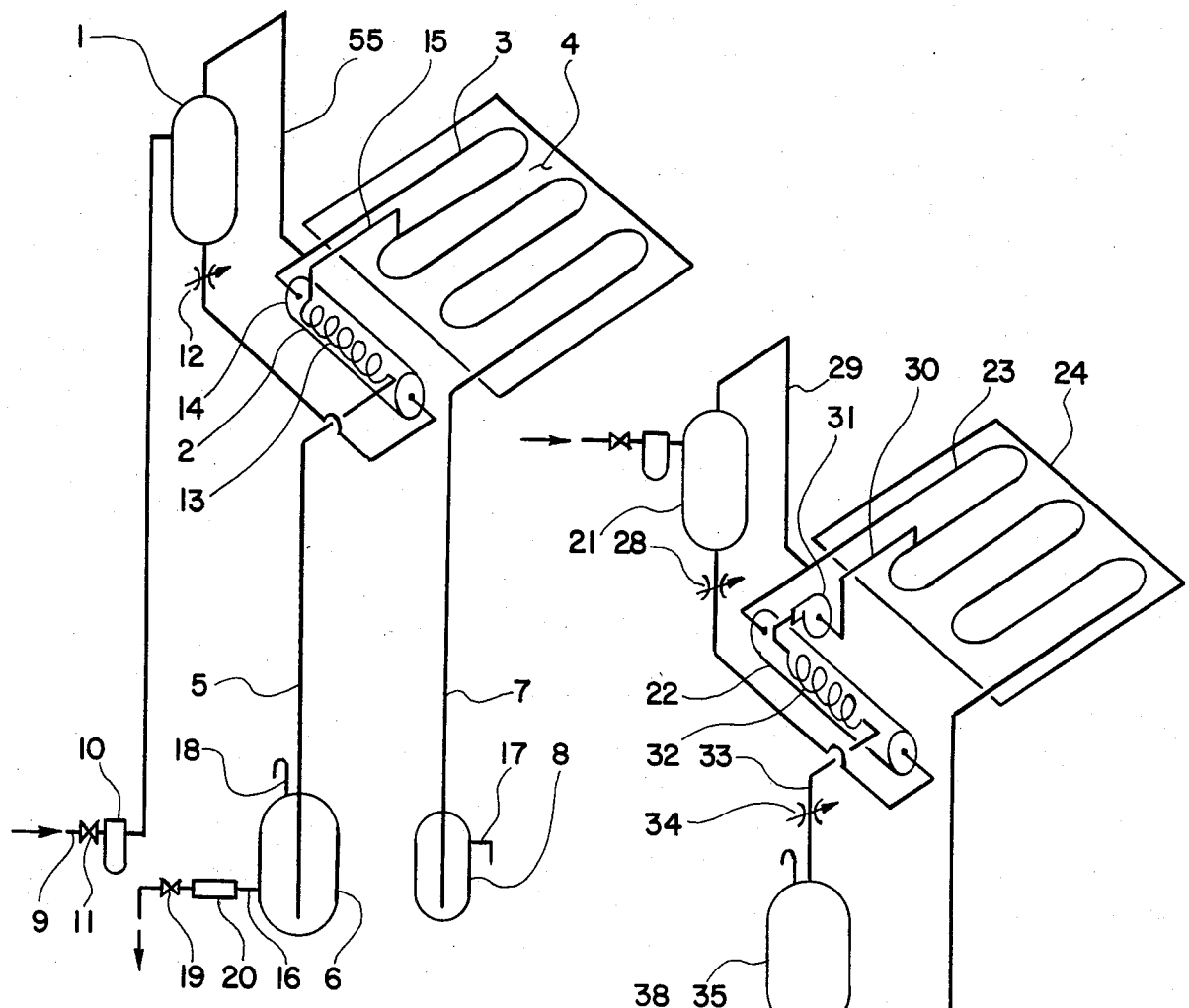
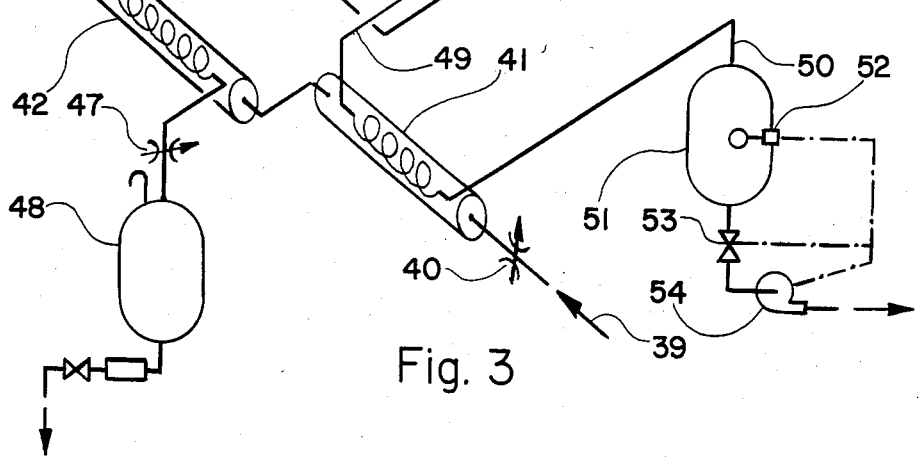
Fig. 1
Fig. 2
Fig. 3

PARTIALLY EVACUATED SOLAR STILL

BACKGROUND OF THE INVENTION

For many centuries, mankind has been practicing the distillation process of obtaining purified water from dirty water. This process involves boiling the dirty water to create steam and condensing the steam back into water. As the contamination of sources of drinking water by industrial wastes and other discharges has become ever more serious in many localities, there has been an increasing demand for an economical and reliable method of obtaining purified water from contaminated water. Modern technology has responded to this demand by developing better filtration technology, such as ultra and reverse osmosis membrane filters; adsorption technology, such as activated carbon columns; and ion exchange technology of various synthetic resins. Although these methods of water purification have been widely accepted and implemented in many industries as well as private dwellings, the cost of installation and operation of such systems is often too high for many average home owners. As an alternative method, the age-old practice of obtaining purified water through distillation by using heat from the sun has been upgraded and improved recently, and is receiving new attention in many under-developed countries. Without exception, the present-day practice of solar distillation employs the so-called solar pond with a transparent cover, allowing solar radiation on the shallow water in the solar pond to heat the water and create evaporation of the water into steam. The steam in contact with the transparent cover loses heat to the atmosphere through the cover and condenses into water drops, which travel down the inside surface of the cover and collect in gutters. As the evaporation of the water in the solar pond takes place only on the free surface of the water, a large free surface area is required in order to evaporate a sizable amount of the water. For this reason, the solar pond requires a shallow pond with a large area.

In view of the fact that the major portion of the heat released by the condensing steam is not recycled since it is lost to the atmosphere through the transparent cover, the solar pond is a primitive system with a low working efficiency. Of course, the sunlight is free, and consequently, there is little requirement for high efficiency in utilizing the sunlight itself. However, the low efficiency of the solar pond creates a problem since the requirement of a large pond area is simply not compatible in many localities with a heavy population density, and a pond with a large area requires more materials of corrosion resisting of grade for construction. A better solar still can be provided by recycling the heat released by the condensing steam to preheat the water to be distilled. This provides an advantage in that the total surface area collecting the sunlight required to evaporate a given amount of water per day can be made significantly smaller compared to the solar pond, resulting in the saving of the space and materials required to construct a solar still. A better solar still can be provided by minimizing the wetted area in the still with a given area for collecting sunlight. The wetted area in a solar still can be reduced for a given amount of the distilled water required per day if the water can be evaporated not only on the free surface but also within the volume of the water—the water has to be boiled. It is a well known fact that the water boils when it is heated or the ambient pressure is lowered. In a better still, the water should be heated by solar energy and, at the same time, the pressure in contact with the water should be partially evacuated in order to promote the boiling of the water.

The primary object of the present invention is to provide a solar still wherein the evaporation of the water heated by the sunlight takes place in the partially evacuated tubings.

Another object of the present invention is to use the vacuum legs on the condensate discharge and the reject discharge in order to maintain the partial vacuum in the heater tubing wherein evaporation of the water takes place.

A further object of the present invention is to provide a solar still including a heat exchanger-condenser that condenses the steam into the water and preheats the water being fed into the heater tubings heated by the solar collector.

Still another object of the present invention is to employ a flow regulating orifice to drip-feed the water into the heater tubings from the feed reservoir in order to minimize the reject flow out of the heater tubings which are wetted with feed water on the bottom half or less of the cross section.

These and other objects of the present invention will become clear as the description thereof proceeds. The present invention may be described with a great clarity and exactness for referring to the following figures:

FIG. 1 illustrates a schematic diagram showing a perspective view of a partially evaculated solar still constructed in accordance with the principles of the present invention.

FIG. 2 illustrates another embodiment of the partially evaculated solar still.

FIG. 3 illustrates a further embodiment of a partially evacuated solar still.

FIG. 1 shows a partially evacuated solar still constructed in accordance with the principles of the present invention, the major components of which are comprised of a feed water tank (1), a heat exchanger-condenser (2), the heater tubings (3) heated by a solar collector (4), a vacuum leg (5) through which the condensate is collected into a distilled water tank (6) and another vacuum leg (7) connected to an over-flow tank (8) through which the reject is discharged. The feed water tank may be filled manually or from the water pipe (9) through a filter (10) by opening the valve (11). Once the feed water tank is filled to a required level, the valve (11) is shut off and the solar still assembly downstream from the valve (11) becomes isolated pressure-wise from the surrounding system. The water to be evaporated is drip-supplied to the heater tubes (3) through the heat exchanger-condenser (2), which is a cylindrical vessel filled with the in-fed water including a condensing coil (13) in it. The heater tubing (3) originates from the feed water discharge end (14) of the heat exchanger-condenser (2) and is routed through the solar collector (4) where it is heated by the sunlight. A pressure equalizing leg (55) branched off from the heater tubing (3) is connected to the top of the feed water tank (1). The steam tubing (15) is branched off vertically from the heater tubing (3) and connected to the inlet of the condensing coil (13), the exit of which is connected to the vacuum leg (5) emptying the condensate to the bottom of the distilled water tank (6). After being routed through the solar collector (4), the heater tubing (3) is connected to the vacuum leg (7) that empties the reject flow into the bottom of the over-flow tank (8). The draw port (16) of the distilled water tank (6) and the over-flow port (17) of the over-flow tank (8) are located at such positions that each tank contains an amount of the water sufficient to fill up the vacuum leg when it is sucked up by the partial vacuum created in the heater tubing (3). A vent (18) to the atmosphere is included in the distilled water tank (6) in order to prevent the pressure build-up in said tank. The distilled water accumulated and stored in the distilled water tank is drawn out by means of the valve (19) through a sterilizer (20), which may be a chlorinator or an ultra-violet light sterilizer.

With the construction of the solar still as shown in FIG. 1, it operates on the following principles: The water drip-fed from the feed water reservoir (1) located at a higher elevation than the heater tubing (3) exits into either the distilled water tank (6) through the evaporation-condensation process or into the over-flow tank (8). Consequently, the discharge of the water from the feed water tank results in the increase of the void volume above the free surface in the feed water tank. This creates a partial evacuation of the pressure in the heater tubing (3), as it is connected to the void space in the feed water tank (1) by the pressure equalizing leg (55). The partial vacuum created by the mechanism as mentioned above and the heat collected by the solar collector (4) boils the water creeping on the bottom of the heater tubing, which is routed in such a way that all or most of the water fed into the heater tubing (3) becomes evaporated, leaving little or no water to be discharged into the over-flow tank (8). The steam filling the heater tubing (3) is forced out through the steam tubing (15) vertically branching off from the heater tubing (3), and flows into the condenser coil (13) where it is condensed into water and flows into the distilled water tank (6). The heat of the condensation released by the condensing steam in the condenser coil (13) is absorbed by the feed water flowing through the heat exchanger-condenser (2). This heat transfer keeps the condenser coil cool, promoting further condensation of the steam while it preheats the water being fed into the heater tubing (3). The weight of the water trapped in the vacuum legs (5) and (7) prevents the atmospheric air from being sucked into the heater tubing (3) and, consequently, maintains the partially evacuated state in the heater tubing (3). It should be understood that the feed water tank (1) is installed at an elevation higher than the heater tubing (3) routed through the solar collector (4), while the distilled water tank (6) and the over-flow tank (8) are located at an elevation significantly lower than the heater tubing (3) in order to provide the required length for the vacuum legs (5) and (7). In order to improve the efficiency in the solar heat utilization, the tubings and components adjacent to the heater tubing (3) may be insulated. It is not difficult to realize that the feed water tank (1) can be eliminated and the flow restricting orifice (12) can be replaced by an automatically controlled orifice which controls the feed rate relative to the rate of the evaporation in the heater tubing (3) in order to maintain a partial vacuum therein, while the water is continuously fed into the heater tubing (3) directly from the water pipe (9).

FIG. 2 shows another partially evacuated solar still constructed in essentially the same manner as that illustrated in FIG. 1 with two exceptions. The water to be distilled is drip-fed from the feed water tank (21) to the heater tubing (23) routed through the solar collector (24) via the flow-restricting orifice (28) and the heat exchanger-condenser (22). The heater tubing (23) exiting the solar collector (24) is connected to the vacuum leg (26) emptying into the bottom of the over-flow tank (27). The pressure-equalizing leg (29) branched off from the heater tubing (23) is connected to the top of the feed water tank (21). The steam tubing (30) branches off from the heater tubing (23) vertically; thereby, the steam generated in the heater tubing (23) with its bottom wetted with the drip-flowing water is drawn into the steam tubing (30) without entraining the water in the heater tubing (23). The steam tubing (30) is connected to the intake of the pressure blower vacuum pump (31), of which discharge is connected to the condensing coil (32) routed through the heat exchanger-condenser (32). The condensing coil (32) is connected to a short vertical leg (33) which may be a vacuum leg of shorter length or a riser emptying the condensate into the distilled water tank (35). A throttling valve (34) may be installed intermediate to the condensing coil (32) and the distilled water tank (35) in order to set the pressure in the condensing coil (32) at a value higher than the atmospheric pressure, if such a condition is desirable. The distilled water accumulated and stored in the distilled water tank (35) is drawn out through a water sterilizer (37) as controlled by the shut-off valve (38). The partially evacuated solar still illustrated in FIG. 2 functions and operates on much the same principle as that of FIG. 1, while the through-put is boosted by the pressure blower (31) that creates an additional partial vacuum in the heater tubing enhancing the evaporation process and creating a compression in the condensing coil to increase the rate of the condensation.

FIG. 3 illustrates a further partially evacuated solar still having essentially the same construction as that of FIG. 2 with one exception, which includes the heat exchanger-condenser (42), heater tubings (43) routed through the solar collector (44), the steam tubing (45) branching from the heater tubings (44) and connected to the pressure blower or vacuum pump (46) that draws the steam out of the heater tubings (43) and blows into the heat exchanger-condenser (42), and the distilled water tank (48) with an orifice (47) installed on its inlet pipe. The exeption is the reject water discharge pipe (49), connected to a heat exchanger (41) which preheats the infeed water fed through the infeed pipe (39) with an automatically controlled flow control orifice (40), which discharge pipe (49) empties the reject water into the reject water tank (51). The water accumulated in the reject water tank (51) is emptied by an automatically controlled valve (53) and a pump (54) controlled by a float switch (52).

It is evident that the solar still illustrated in FIG. 1 will function and operates effectively without the partial evacuation of the heater tubing, when the solar collector heats the heater tubing to the boiling temperature of the water at the atmospheric pressure. Consequently, the vacuum legs 5 and 7 may be replaced by the short riser tubings, if the solar collector employed to heat the heater tubing is a concentrating collector that heats the heater tubing to the temperature equal to or higher than the boiling point of the water at the atmospheric pressure. It is also evident in the solar still illustrated in FIG. 2 that the vacuum leg (26) may be substituted with a short riser with a float valve that opens to discharge only when a sizeable amount of the reject becomes accumulated in said short riser. Apart from the specific arrangement of the solar still, it is important to provide a certain minimum amount of the slope over the entire length of the heater tubing so that the water does not accumulate at any segment of the heater tubing and to set the flow-restricting orifice disposed intermediate the feed water tank and the solar collector in such a degree that most of the water fed into the heater tubing becomes evaporated with little reject water discharged through the discharge vacuum leg. Of course, when the feed water contains residues of significant fraction, such as the dissolved salt in the sea water, a certain minimum amount of the reject discharge flow through the vacuum leg has to be maintained in order to wash out the residues continuously generated in the heater tubing by the evaporation of the feed water. In such a case, a heat exchanger may be installed intermediate the heater tubing and the vacuum leg to recover the heat from the reject flow, which heat is used to preheat the infeed water into the heater tubing.

While the principles of the present invention have now been made clear by the illustrative embodiment, there will be immediately obvious to those skilled in the art, many modifications of the structures, elements, arrangement, proportions and materials which are particularly adapted to the specific working environments in the practice of the invention without departing from those principles.

What is claimed is:

1. A partially evacuated solar still comprising in combination:
    (a) a solar collector including a plurality of heater tubings wherein solar heat collected by the solar collector heats said heater tubings;
    (b) a feed water supply means including a feed tubing for feeding water into said heater tubings wherein said water is evaporated to steam by heat transferred to said heater tubings from said solar collector;
    (c) means for withdrawing said steam from said heater tubings through at least one steam tubing branching off from said heater tubings;
    (d) a condenser for condensing said steam into water wherein the heat of condensation released by the steam is used to preheat the water fed to said heater tubings;
    (e) a flow controlling means on said feed tubing for controlling the feed rate of the water fed to said heater tubings;
    (f) means connected to said heater tubings for creating and maintaining a partial vacuum in said heater tubings; and
    (g) means for purging reject water from said heater tubings without breaking said partial vacuum in said heater tubings.

2. The combination as set forth in claim 1 wherein the means for creating and maintaining a partial vacuum in said heater tubings comprises a vacuum leg or riser tubing connected to a distilled water tank through which the condensate is discharged.

3. The combination as set forth in claim 2 wherein the means for purging reject water in (g) comprises another vacuum leg or riser tubing connected to an overflow tank through which the reject water is discharged.

4. The combination as set forth in claim 3 wherein the overflow tank is equipped with a discharge pump controlled by a float switch.

5. The combination as set forth in claim 1 wherein the means for creating and maintaining a partial vacuum in said heater tubings comprises a pressure blower or vacuum pump connected to said steam tubing intermediate the heater tubings and the condenser.

* * * * *